Patented Mar. 20, 1951

2,545,689

UNITED STATES PATENT OFFICE 2,545,689

POLYMERS FROM ALLYLIC ALCOHOL MONOETHERS OF TRIHYDRIC ALCOHOLS

Hans Dannenberg and David E. Adelson, Berkeley, Calif., assignors to Shell Development Company, San Francisco, Calif., a corporation of Delaware No Drawing. Application January 3, 1948, Serial No. 470

15 Claims. (Cl. 260—91.1)

This invention relates to polymers from allylic alcohol monoethers of trihydric alcohols and to a method of producing them. More particularly the invention provides a process for an economical polymerization of such ethers, and in its most specific embodiment provides poly(3-allyloxy-1,2-propanediol), the polymer of the alpha-allyl monoether of glycerol, prepared by air blowing the monomer.

It is known to polymerize the unsaturated alcohol polyethers of polyhydric alcohols. Such ethers contain a plurality of polymerizable groups and their polymerization is readily induced. The diallyl diether of glycerol, for example, polymerizes spontaneously merely upon standing. It is an inherent characteristic of such polyethers that their complete polymerization results in the formation of the three dimensional cross-linked polymers known as infusible polymers. Infusible polymers are characterized by their extreme insolubility in the vast majority of solvents and their resistance to melting or softening at temperatures below their decomposition temperature. Polymers prepared from the unsaturated alcohol polyethers of polyhydric alcohols therefore have a relatively limited application in the field of plastics. A typical use of such polymers embodies a careful incomplete polymerization of the monomer to a form still retaining the solubility characteristics of the fusible linear polymers, the application of films of the incompletely polymerized material upon other plastic materials, and their subsequent infusibilization to provide a resistant surface coating. Polyhydric alcohols are themselves capable of being polymerized under various conditions, generally by heating in the presence of alkaline reacting catalysts, and this property has led to the production of a different class of polymeric unsaturated alcohol polyethers of polyhydric alcohols. Typical of these materials are the polymers formed by polymerizing glycerol and etherifying the polyglycerol with unsaturated alcohols, generally high molecular weight alcohols of above 18 carbon atoms. In this manner polymers are formed which have great value as anti-spattering agents and emulsifying agents, but are of little utility in the field of plastics.

It is therefore an object of the present invention to provide a process employing a particular class of unsaturated alcohol ethers of polyhydric alcohols in which a single allylic alkenyl radical replaces the hydrogen atom of one hydroxyl group of a trihydric alcohol, and producing valuable fusible linear polymers. Another object is the provision of a process for the production of poly(3-allyloxy-1,2-propanediol) that is not dependent upon the employment of a catalyst or severe reaction conditions. A further object of the invention is the provision of a class of polymeric materials having molecular weights of 1000 or above, a linear structure, and an average of a single unsaturated linkage per polymeric molecule. Still other objects and advantages of the invention will be apparent from the following description.

We have now found that heating the allylic alcohol monoethers of trihydric alcohols in the presence of polymerization catalysts containing an oxygen atom directly linked to another oxygen atom produces particularly valuable linear polymers. As employed throughout the specification and appended claims, the term "allylic" alcohol is employed in the sense that it is used by the writers of modern chemical texts, to mean the alcohols exhibiting unique chemical properties by virtue of the presence of a hydroxyl group and a non-conjugated olefinic double bond in the structural arrangement C=C—C—OH, and is herein limited to the class of such alcohols in which the remaining valences of the carbon atoms are satisfied by hydrogen atoms or saturated aliphatic hydrocarbon radicals.

The discovery that allylic alcohol monoethers of trihydric alcohols, particularly such ethers of glycerol, form linear polymers when heated in the presence of the catalysts more fully described below, many of which are known to be oxidizing agents, is surprising in view of the reactions which by analogy would be expected to result from such a treatment. Heating in the presence of gaseous oxygen is well known to be a general method for the oxidation of organic compounds, e. g., "air-blowing," or the process of maintaining an organic compound to be oxidized at an elevated temperature while introducing oxygen, usually in the form of air. Glycerol is known to form mixtures of glyceraldehyde and dihydroxy acetone upon mild oxidation, and further oxidation products form a more strenuous oxidation. A similar reaction would be expected from an ether of glycerol in which two hydroxyl groups remain unsubstituted and thus available for oxidation. In addition, the double bond of the allylic alcohols is known to be susceptible to oxidation as illustrated by the formation of glycerol from a reaction of allyl alcohol with an oxygen-yielding oxidizing agent.

In the present process, however, these numerous oxidation reactions which would be expected to be the predominant reaction induced by the air blowing treatment occur but to a very limited extent. Surprisingly enough the reaction is substantially one of carbon-to-carbon polymerization. As will be more fully illustrated by the detailed examples, the monomeric alkenyl ether of glycerol which has a high content of hydroxyl groups per unit weight, as well as a high content of unsaturated groups per unit weight is converted to a poly(alkenyloxypropanediol) having substantially the same content of hydroxyl groups per unit weight but in which the content of unsaturated groups per unit weight have been reduced substantially in direct proportion to the number of molecules of the monomer combined in each molecule of polymer. Thus the polymerization predominately occurs by the addition of the carbon-to-carbon unsaturated linkages to form linear polymers, and the expected oxidation reactions to form complex mixtures in which the hydroxyl groups have been converted to more highly oxidized forms does not occur, or takes place to only a very limited extent.

Allylic alcohol monoethers of trihydric alcohols forming suitable starting materials for the present process may also be defined as 2-alkenyl dihydroxyalkanyl ethers. Of such ethers it has been found preferable to employ those in which the dihydroxyalkanyl radical is a 2,3-dihydroxypropanyl radical, —CH$_2$CH(OH)CH$_2$OH, and in which the 2-alkenyl radical contains a terminal methylene group (=CH$_2$). The preferred starting materials are thus 2-methylenealkanyl dihydroxypropyl ethers and such ethers in which the 2-methylidenealkanyl radical contains not more than about 6 carbon atoms produce particularly valuable polymers having high molecular weights, excellent solubility properties, and the property of readily entering into reactions with unsaturated acids to form valuable coating materials.

Illustrative examples of 2-alkenyl dihydroxyalkanyl ethers include, 3-allyloxy-1,2-propanediol, 2-allyloxy-1,3-propanediol, 2-methyl-2-propenyl, 2,3-dihydroxybutyl ether, crotyl 2,3-dihydroxy-2-methylpropyl ether, 2-pentenyl 1,1-dimethyl-2,3-dihydroxypropyl ether, 2-methylenepentyl, 2,3- or 1,3-dihydroxypropyl ether, and 2-pentenyl 2,4-dihydroxybutyl ether.

Illustrative examples of 2-methylenealkanyl dihydroxypropyl ethers include, 3-allyloxy-1,2-propanediol, 2-methyl-2-propenyl 1,3- or 2,3-dihydroxypropyl ether, 2-methylenepentyl 1,3- or 2,3-dihydroxypropyl ether, 2-methylenebutyl 1,2- or 2,3-dihydroxypropyl ether and 1-methyl-2-methylenepropyl 2,3-dihydroxypropyl ether.

A wide range of reaction temperatures may be employed in the execution of the process of the invention, any temperature from about normal room temperature to the decomposition temperature of the alkenyl monoether of glycerol employed being suitable. A generally preferred range of temperatures lies between 100° C. to 250° C.

The process of the invention may be generically defined as heating a 2-alkenyl dihydroxyalkanyl ether in the presence of a polymerization catalyst which contains an oxygen atom linked directly to another oxygen atom, and which initiates polymerization by forming compounds having an acid ionization constant of less than 0.4. A variety of substances are suitable for catalyzing the reaction including benzoyl peroxide, hydrogen peroxide, barium peroxide, sodium peroxide, the alkali metal perborates and persulfates, tetralin peroxide, olefin peroxide, acetyl peroxide, acetone peroxide and the like.

Of these compounds benzoyl peroxide and hydrogen peroxide are preferred catalysts. The catalysts are used in amounts ranging from about 0.5 to 5.0 per cent of the ether being treated. If desired, of course, smaller or larger amounts of catalyst may be utilized. As the reaction proceeds, the catalyst may be consumed to a greater or lesser extent, and this may be obviated by addition of fresh catalyst to the reaction mixture to replace that which is destroyed or consumed.

A particularly preferred catalyst for use in the process is a gas containing molecular oxygen. Molecular oxygen may be used in a substantially pure form or may contain various diluent gases such as nitrogen, carbon dioxide, argon or other inert gases. Preferably the gas contains at least 10 per cent of molecular oxygen. Air is ordinarily well suited for effecting the desired polymerization. It is preferred that the compound employed as a catalyst have an appreciable solubility in the ether subjected to polymerization, e. g., that the compound be at least as soluble at 25° C. as the oxygen of air in the ether under a total pressure of one atmosphere.

The process may be conducted in a variety of manners. In general, it is preferable to conduct the polymerization in a closed vessel equipped with a heating means. When a non-gaseous catalyst is employed, the catalyst is mixed with the ether and the mixture is heated to effect the polymerization. In cases where a gaseous catalyst is used, the gas is dispersed through the heated liquid ether and preferably recycled. It is usually preferable to provide passage of the discharged gaseous catalyst through some recovering means such as a condenser to remove the minor amounts of ether carried along with the gaseous current.

While it is generally preferable to employ a pure 2-alkenyl dihydroxyalkanyl ether, in certain cases it has been found desirable to employ an inert solvent. Hydrocarbons are particularly suitable for this purpose and examples of such compounds include benzene, toluene, heptane, hexane, naphtha and the like.

The chemical purity of the monomeric ether has been found to be an important factor in the color of the resulting polymer. Where clear light colored polymers are desired it is preferable to employ a 2-alkenyl dihydroxyalkanyl ether which is substantially free of halogen.

In polymerizing the ethers, the polymerization reaction is ordinarily stopped before all of the monomer has been converted to the polymer, thus allowing a more convenient removal of the monomer by distillation. In the present process the reaction products may in addition be readily separated by selective solvation. The monomeric 2-alkenyl dihydroxyalkanyl ether is in many cases soluble in solvents such as acetone, while the poly(2-alkenyl dihydroxyalkanylether) is insoluble in solvents of this type but is soluble in a solvent such as isopropyl alcohol.

The novel linear polymers of the invention are very valuable substances. They find application as plasticizers and softeners for various plastic materials in which an increased solubility for ionic solvents is of advantage. They have the general properties of very high molecular weight aliphatic polyhydric alcohols, and have a particular valuable application as intermediates in the formation of air drying surface coatings, to which they are converted by esterification with high molecular weight unsaturated acids.

For the purpose of further illustrating the invention, the following examples are given, although it is to be understood that these examples are to be in no way construed as limiting the invention to the reactants, catalysts, or modes of operation recited therein.

*Example I.—Air-blowing at 190° C.*

Monomeric 3-allyloxy-1,2-propanediol having a refractive index of $n_D^{20}$ 1.4620 and a chlorine content of less than 0.02% was maintained at a temperature of 190° C. in a glass vessel equipped with a reflux condenser. A stream of air was introduced beneath the surface of the liquid through a sintered glass disk for a period of 7 hours. The refractive index rose to $n_D^{20}$ 1.4920 an increase of 0.0300 corresponding to a 56% conversion to polymer as determined from a graph of refractive index against polymer content. The polymer was found to have a molecular weight of 1020 by an ebullioscopical determination in ethyl alcohol corresponding to an average of 7.7 monomer units in the polymer molecules. The theoretical hydroxyl value of the momoner is 1.513 and the polymer was found to have a hydroxyl value of 1.34(5) equivalent per 100 grams corresponding to a retention of 89% of the hydroxyl groups unchanged. The monomeric ether was found to have an iodine number of 199.6 and the polymer to have one of 22.5, which is 8.8 times less than that of the monomer. The polymer was found to have an acidity of only 0.01(0) equivalent per hundred grams and a carbonyl value of 0.12(6) equivalent per hundred grams.

Two additional reactions were conducted in the same manner employing 3-allyloxy-1,2-propanediol and blowing times of 7 and 12 hours, respectively. A maximum conversion to polymer of 70% was obtained. The polymers had Gardner colors of less than 10, viscosities of 250 and 115 poises and a combined sample of the two was found to have a molecular weight of 1000, hydroxyl value of 1.22(4) equivalents per 100 grams, an iodine number of 27.4, an acidity of 0.001(5) equivalent per 100 grams and a carbonyl value of 0.001(5) equivalent per 100 grams.

To illustrate the effect of the halogen content on the polymer, a sample of 3-allyloxy-1,2-propanediol having a chlorine content of 0.27% was polymerized for 7 hours in the same manner. The resulting polymer was of a dark amber color (Gardner color of 16).

*Example II.—Air-catalyzed polymerization at 130° C.*

Monomeric 3-allyloxy-1,2-propanediol was heated in a glass vessel at 150° C. while a slow stream of air was passed into the liquid for about 25 hours. The refractive index rose to 1.4888 corresponding to a 46% conversion to polymer. The monomer was extracted from the polymer by means of acetone in which the monomer was soluble and the polymer insoluble. The polymer was then dissolved in isopropyl alcohol, filtered and the solvent removed. The polymer was analyzed as follows:

|  | Found | Calculated as $(C_6H_{12}O_3)_2$ |
|---|---|---|
| Per cent carbon | 54.9(5) | 54.54 |
| Per cent hydrogen | 9.2(9) | 9.09 |
| Per cent oxygen | 35.7(6) | 36.37 |
| Molecular weight | 270±10 | 264 |

*Example III.—Air-catalyzed polymerization at 200° C.*

The reaction was conducted in the manner described in Example I except that a temperature of 200° C. was maintained. In 8 hours the reaction mixture had a refractive index of $n_D^{20}$ 1.4724 corresponding to a conversion to polymer of about 47%.

*Example IV.—Organic peroxide initiated polymerization*

When 2-methylenebutyl 2,3-dihydroxypropyl ether is heated in a pressure resistant vessel in the presence of 3% by weight of tertiary-butyl hydroperoxide is maintained for 24 hours at 200° C., a fusible polymer containing a plurality of hydroxyl groups is formed.

*Example V.—Inorganic peroxide initiated polymerization*

When 2-methylene-3-methylbutyl 2,3-dihydroxypropyl ether is heated to 150° C. in the presence of 5% by weight of sodium perborate while being continuously agitated in a pressure resistant vessel, a fusible polymer containing a plurality of hydroxyl groups is formed.

We claim as our invention:

1. A method of preparing poly(3-allyloxy-1,2-propanediol) which comprises heating 3-allyloxy-1,2-propanediol as sole polymerizable compound to a temperature of substantially 190° C. while passing oxygen into the liquid ether.

2. A method of preparing poly(3-allyloxy-1,2-propanediol) which comprises heating 3-allyloxy-1,2-propanediol as sole polymerizable compound to a temperature between 100° C. to 250° C. while passing oxygen into the liquid ether.

3. A method of preparing poly(3-allyloxy-1,2-propanediol) which comprises heating 3-allyloxy-1,2-propanediol as sole polymerizable compound to a temperature between 100° C. to 250° C. in the presence of a polymerization catalyst which contains an oxygen atom directly attached to another oxygen atom.

4. A process for the polymerization of a 2-methylenealkanyl dihydroxypropyl ether which comprises heating the ether as sole polymerizable compound to a temperature between 100° C. to 250° C. while introducing oxygen.

5. A process for the polymerization of a 2-alkenyl dihydroxyalkanyl ether which comprises heating the ether as sole polymerizable compound to a temperature between 100° C. to 250° C. while introducing oxygen.

6. A linear addition homopolymer of 3-allyloxy-1,2-propanediol.

7. A linear addition homopolymer of a 2-methylenealkanyl dihydroxypropyl ether.

8. A linear addition homopolymer of a 2-alkenyl dihydroxyalkanyl ether.

9. A process for producing linear polymers by air-blowing which comprises air-blowing 3-allyloxy-1,2-propanediol as sole polymerizable compound at a reaction temperature of substantially 190° C.

10. A process for producing linear polymers by air-blowing which comprises air-blowing a 2-methylenealkanyl dihydroxypropyl ether as sole polymerizable compound at a temperature between 100° C. and 250° C.

11. A process for producing linear polymers by air-blowing which comprises air-blowing a 2-alkenyl dihydroxyalkanyl ether as sole polymerizable compound at a temperature between 100° C. and 250° C.

12. A process for the polymerization of a 2-alkenyl dihydroxypropyl ether which comprises heating the ether as sole polymerizable compound to a temperature between 100° C. to 250° C. while introducing oxygen.

13. A linear addition homopolymer of a 2-alkenyl dihydroxypropyl ether.

14. A process for the production of a linear polymer of a 2-methylenealkanyl dihydroxypropyl ether which comprises heating said ether as sole polymerizable compound at 100° C. to 250° C. in liquid phase in intimate admixture with a polymerization catalyst which contains an oxygen atom linked directly to another oxygen atom.

15. A process for the production of a linear polymer of a 2-alkenyl dihydroxyalkanyl ether which comprises heating said ether as sole polymerizable compound to an elevated temperature which is below the decomposition temperature of the ether in the presence of a polymerization catalyst which contains an oxygen atom linked directly to another oxygen atom.

HANS DANNENBERG.
DAVID E. ADELSON.

REFERENCES CITED

The following references are of record in the file of this patent:

UNITED STATES PATENTS

| Number | Name | Date |
|---|---|---|
| 2,401,959 | Pfann et al. | June 11, 1946 |
| 2,462,817 | Smith | Feb. 22, 1949 |

OTHER REFERENCES

Nichols et al.: "New Bases for Coating and Plastic Compositions," article in Official Digest, pages 111-123, March 1945.